July 2, 1935.  R. J. ADAMS  2,006,616
INDICATOR FOR BOTTLES
Filed Nov. 14, 1934
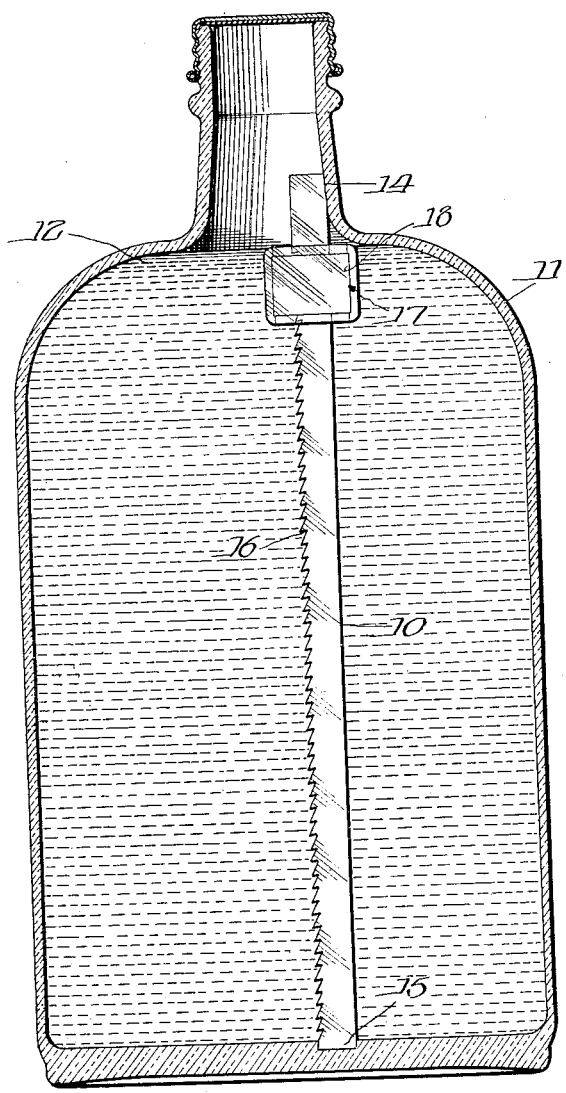
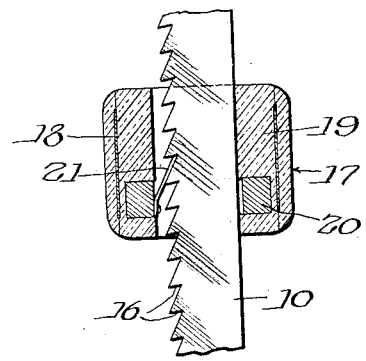
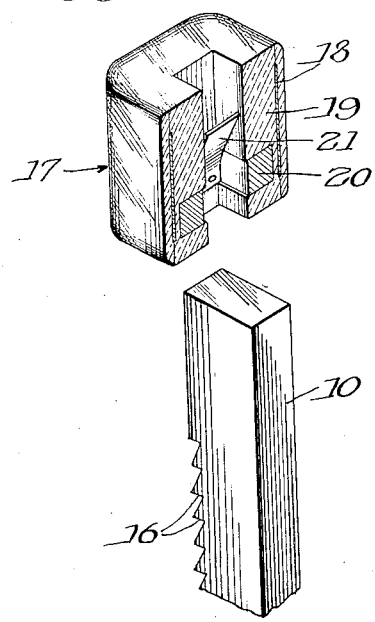
Inventor:
Raphael J. Adams.
By James R. McKnight
Attorney Patented July 2, 1935

2,006,616

UNITED STATES PATENT OFFICE 2,006,616

INDICATOR FOR BOTTLES

Raphael J. Adams, Chicago, Ill.

Application November 14, 1934, Serial No. 752,935

1 Claim. (Cl. 215—8)

My invention relates to an indicator for bottles.

Among the objects of my invention are to provide an indicator for bottles containing liquid which will indicate how much of the original liquid of the bottle has been withdrawn; to provide an indicator having luminescent qualities so that the indicator may be seen through a dark colored bottle and also through dark liquid; to supply an indicator having a resilient member within the said indicator so that the resilient member cannot be tampered with without breaking the indicator; to create an indicator having means limiting the movement of said indicator to a downward direction; to create an indicator which when the bottle is turned upside down will remain at the true level of the liquid; to supply the combination of a bottle specially constructed together with an indicator so that they may operate together, and such other objects, advantages and capabilities as will later more fully appear and which are inherently possessed by my invention.

Referring to the drawing: Fig. 1 is a vertical sectional view showing my invention; Fig. 2 is a cross-sectional view of my rod and indicator mounted thereon; Fig. 3 shows a cross-section of the indicator and a corresponding part of the rod in elevation.

While I have shown in the accompanying drawing a preferred embodiment of my invention yet I wish it understood that the same is susceptible of modification and change without departing from the spirit of my invention.

My invention more in detail comprises a rod 10 which should ordinarily be constructed of glass, and which should occupy a substantial central vertical position when placed in a glass bottle 11 containing liquid 12. Adjacent the side of the top of the rod 10 said rod is fused or otherwise joined to the neck 14 of said bottle 11 for permanent connection with said bottle. Rod 10 continues downwardly to the bottom of the bottle, where it is fixed against lateral movement by fitting into a well 15. This provision is desirable where bottles are manufactured in advance to be fitted with my indicator structure, but it is not essential that the well 15 be provided. Where my device is to be inserted into bottles without the well 15, the rod 10 may extend to a point adjacent the bottom.

My rod 10 is preferably substantially rectangular in cross section and has a plurality of downwardly hooked ratchet teeth 16.

Surrounding the rod 10 is an indicator 17 preferably constructed of glass and having an inner lining of luminescent material 18. The glass body member 19 of the indicator 17 holds an inner metal ferrule 20 which is so constructed as to snugly contact the rod 10. A resilient member 21 fitted into the ferrule 20 extends to contact the ratchet teeth 16. This resilient member 21 is within the indicator 17 and is thus safe from contact with outside sources that might tamper with it and destroy its function.

In use my indicator structure is inserted into a bottle 11 and fused or otherwise joined permanently to the neck 14 of the bottle. It can then only be removed by breaking the bottle. The indicator 17 is placed at the liquid level of the liquid 12 in the container. As the liquid 12 is withdrawn the indicator will fall through the intervening space to the new liquid level and thus indicate the amount of liquid withdrawn. Because I do not construct my indicator 17 as a simple float, but make it slightly heavier than the liquid it is necessary to have the spring tension of the resilient member 21 to prevent the indicator from sinking. This, however, creates a true indicator because when the bottle 11 is turned upside down the indicator 17 not being a float will not float to the bottom as a float would do so that when the bottle is again returned to upright position the float is at a lower position than it should be and would indicate that more liquid had been withdrawn than was really the case. My indicator cannot float when the bottle is turned upside down to an incorrect registering position.

Having thus described my invention, I claim:

An indicating device for a bottle containing liquid comprising a notched rod within said bottle and permanently attached thereto so that said rod cannot be removed without breaking the bottle, an indicator having an inner lining of luminescent material mounted on said rod at the level of the liquid in said bottle, said indicator being slightly heavier than liquid, and a resilient member within said indicator so that said resilient member cannot be tampered with without breaking said indicator, said resilient member permitting downward movement of the indicator on said rod in a downward direction toward the bottom of said bottle so that as liquid is withdrawn the indicator will move to indicate the amount of liquid withdrawn but said resilient member preventing movement of the indicator upwardly toward the bottom of the bottle when the said bottle is turned upside down.

RAPHAEL J. ADAMS.